(12) United States Patent
Kaburagi et al.

(10) Patent No.: US 11,837,691 B2
(45) Date of Patent: Dec. 5, 2023

(54) BATTERY MANUFACTURING METHOD (71) Applicant: Nissan Motor Co., Ltd., Yokohama (JP)

(72) Inventors: Tomohiro Kaburagi, Kanagawa (JP); Kazuyuki Yoda, Kanagawa (JP); Eiji Minegishi, Kanagawa (JP); Noboru Yamauchi, Kanagawa (JP); Yusuke Emori, Kyoto (JP); Hideki Ishitani, Kyoto (JP); Masanori Shimada, Kyoto (JP)

(73) Assignee: Nissan Motor Co., Ltd., Yokohama (JP)

( * ) Notice: Subject to any disclaimer, the term of this patent is extended or adjusted under 35 U.S.C. 154(b) by 755 days.

(21) Appl. No.: 16/979,893

(22) PCT Filed: Mar. 20, 2019

(86) PCT No.: PCT/JP2019/011845
§ 371 (c)(1),
(2) Date: Sep. 11, 2020

(87) PCT Pub. No.: WO2019/198454
PCT Pub. Date: Oct. 17, 2019

(65) Prior Publication Data
US 2021/0013539 A1    Jan. 14, 2021

(30) Foreign Application Priority Data
Apr. 9, 2018    (JP) .................................. 2018-074689

(51) Int. Cl.
*H01M 10/04* (2006.01)
*H01M 10/0585* (2010.01)
(Continued)

(52) U.S. Cl.
CPC ......... *H01M 10/0468* (2013.01); *H01M 4/13* (2013.01); *H01M 4/139* (2013.01);
(Continued)

(58) Field of Classification Search
CPC ............. H01M 4/139; H01M 10/0413; H01M 10/0418; H01M 10/0468; H01M 10/052;
(Continued)

(56) References Cited

U.S. PATENT DOCUMENTS

| 8,415,049 B2 | 4/2013 | Shimamura et al. |
| 2004/0157130 A1* | 8/2004 | Ohsawa ................ H01M 4/139 429/210 |

(Continued)

FOREIGN PATENT DOCUMENTS

| JP | 2008-147009 A | 6/2008 |
| JP | 2009-295553 A | 12/2009 |

(Continued)

*Primary Examiner* — Peter Dungba Vo
*Assistant Examiner* — Joshua D Anderson
(74) *Attorney, Agent, or Firm* — Global IP Counselors, LLP (57) ABSTRACT

A battery manufacturing method includes forming a unit cell having a positive electrode that is obtained by a positive electrode active material layer containing an electrolytic solution being disposed on a positive electrode current collector, a negative electrode that is obtained by a negative electrode active material layer containing an electrolytic solution being disposed on a negative electrode current collector, and a separator interposed between the positive electrode and the negative electrode. The battery manufacturing method further includes applying pressure to one unit cell or with two or more stacked unit cells from the stacking direction, and charging the one unit cell or the two or more stacked unit cells after applying of the pressure. The method is performed such that the positive electrode and the nega- (Continued)

tive electrode are formed without an application film being subjected to a drying process performed through heating.

5 Claims, 6 Drawing Sheets

(51) Int. Cl.
  *H01M 10/44* (2006.01)
  *H01M 4/13* (2010.01)
  *H01M 4/139* (2010.01)
(52) U.S. Cl.
  CPC ... *H01M 10/0418* (2013.01); *H01M 10/0585* (2013.01); *H01M 10/446* (2013.01); *Y10T 29/4911* (2015.01); *Y10T 29/49108* (2015.01); *Y10T 29/49115* (2015.01); *Y10T 29/53135* (2015.01)
(58) Field of Classification Search
  CPC ............ H01M 10/0585; H01M 10/446; Y10T 29/49108; Y10T 29/4911; Y10T 29/49115; Y10T 29/53135
  See application file for complete search history.

(56) References Cited

U.S. PATENT DOCUMENTS

| | | | |
|---|---|---|---|
| 2008/0131775 A1* | 6/2008 | Takayama | H01M 10/052 429/210 |
| 2009/0233164 A1* | 9/2009 | Shimamura | H01M 50/193 429/210 |
| 2009/0253038 A1* | 10/2009 | Segawa | H01M 10/044 100/90 |
| 2010/0255371 A1* | 10/2010 | Takayama | H01M 4/13 156/182 |
| 2015/0270585 A1 | 9/2015 | Sasaoka et al. | |

FOREIGN PATENT DOCUMENTS

| | | |
|---|---|---|
| JP | 2015-118816 A | 6/2015 |
| WO | 2006/062204 A1 | 6/2006 |

\* cited by examiner

BATTERY MANUFACTURING METHOD

CROSS-REFERENCE TO RELATED APPLICATIONS

This application is a U.S. national stage application of International Application No. PCT/JP2019/011845, filed on Mar. 20, 2019, which claims priority to Japanese Patent Application No. 2018-074689, filed on Apr. 9, 2018. The entire disclosure of Japanese Patent Application No. 2018-074689 is incorporated in this specification by reference.

BACKGROUND

Technical Field

The present invention relates to a battery manufacturing method.

Background Technology

Development of secondary batteries that can be repeatedly charged and discharged as motor-driving power sources for electric vehicles (EV) and hybrid electric vehicles (HEV) is widespread. A secondary battery is manufactured by: forming a unit cell in which a positive electrode that comprises a positive electrode active material layer containing an electrolytic solution, and a negative electrode that comprises a negative electrode active material layer containing an electrolytic solution, are stacked with a separator interposed therebetween; and sealing, inside an outer cladding, a stack in which a plurality of the unit cells are stacked.

For example, Japanese Laid-Open Patent Application No. 2009-295553 (Patent Document 1) discloses a method for manufacturing a secondary battery, the method including: applying, to the surface of a current collector, an electrode active material slurry that includes an electrode active material, a binder, and a solvent, thus forming an application film; and using dried electrodes, in which the application film has been dried, to create unit cells.

SUMMARY

According to investigations performed by the inventors, it has been established that in a step for manufacturing a dry electrode that contains a binder as disclosed in Patent Document 1, there are cases where cracking occurs when the electrode active material slurry is dried. Cracking of the electrode can cause a great reduction in battery performance. The inventors continued their investigations into a method for creating a unit cell using an electrode comprising a current collector and active material layers containing an electrolytic solution, as a manufacturing method that does not include a step for drying an electrode active material slurry, in order to prevent the occurrence of such cracking.

Electrodes containing an electrolytic solution are softer and readily deformable than a dry electrode. In addition, electrodes containing an electrolytic solution are wet, and therefore is more susceptible to formation of creases (irregularities) in the current collector and/or separator in formation of the unit cell than dry electrodes. According to investigations performed by the inventors, it has been established that when a unit cell is subjected to initial charging in a state in which the electrodes are deformed in this manner or in which creases remain on the surfaces thereof, the unit cell can deform excessively due to unbalanced generation of gas and/or changes in volume. A unit cell that has deformed excessively is not readily molded after the initial charging step, and therefore the internal resistance of the battery can rise.

The present invention was contrived in view of the matters described above, it being an object of the present invention to provide a method for manufacturing a battery in which it is possible to reduce the internal resistance of the battery by molding a unit cell before an initial charging step.

The battery manufacturing method according to the present invention for achieving the above-mentioned object has a unit cell formation step, a surface pressing step, and an initial charging step executed after the surface pressing step. In the unit cell formation step, a unit cell is formed in which a positive electrode obtained by a positive electrode active material layer containing an electrolytic solution disposed on a positive electrode current collector, and a negative electrode obtained by a negative electrode active material layer containing an electrolytic solution disposed on a negative electrode current collector with a separator interposed therebetween. In the surface pressing step, a pressing surface of a pressing part is brought into surface contact with one unit cell or with two or more stacked unit cells from the stacking direction and pressure is applied. In the initial charging step, the one unit cell or the two or more stacked unit cells pressed in the surface pressing step are charged.

BRIEF DESCRIPTION OF THE DRAWINGS

Referring now to the attached drawings which form a part of this original disclosure.

DETAILED DESCRIPTION OF EMBODIMENTS

A preferred embodiment of the present invention is described below with reference to the drawings. However, the technical scope of the present invention should be determined on the basis of the recitations in the claims, and is in no way limited to only the embodiment described below. After the battery according to the present invention is described in terms of advantages below, a battery manufacturing method according to the present invention is described in detail. Dimensions and proportions in the drawings are exaggerated for expediency of description, and can differ from actual proportions. In this specification, "X-Y" as used to indicate ranges refers to values "equal to or greater than X and equal to or less than Y."

Battery

A bipolar lithium ion secondary battery, which is one type of non-aqueous-electrolyte secondary battery, is described as one example of the battery according to the embodiment of the present invention. However, the battery to which the present invention is applied is not limited to bipolar lithium ion secondary batteries. A "bipolar lithium ion secondary battery" is a secondary battery that includes bipolar electrodes and is configured so that charging and discharging are performed due to transfer of lithium ions between a positive electrode and a negative electrode. For example, the present invention can also be applied to any conventionally well-known secondary battery, such as a so-called parallel stacked battery in which electrodes are connected in parallel in a power-generating element. In the description below, the bipolar lithium ion secondary battery is referred to simply as a "battery."

Figure 1:
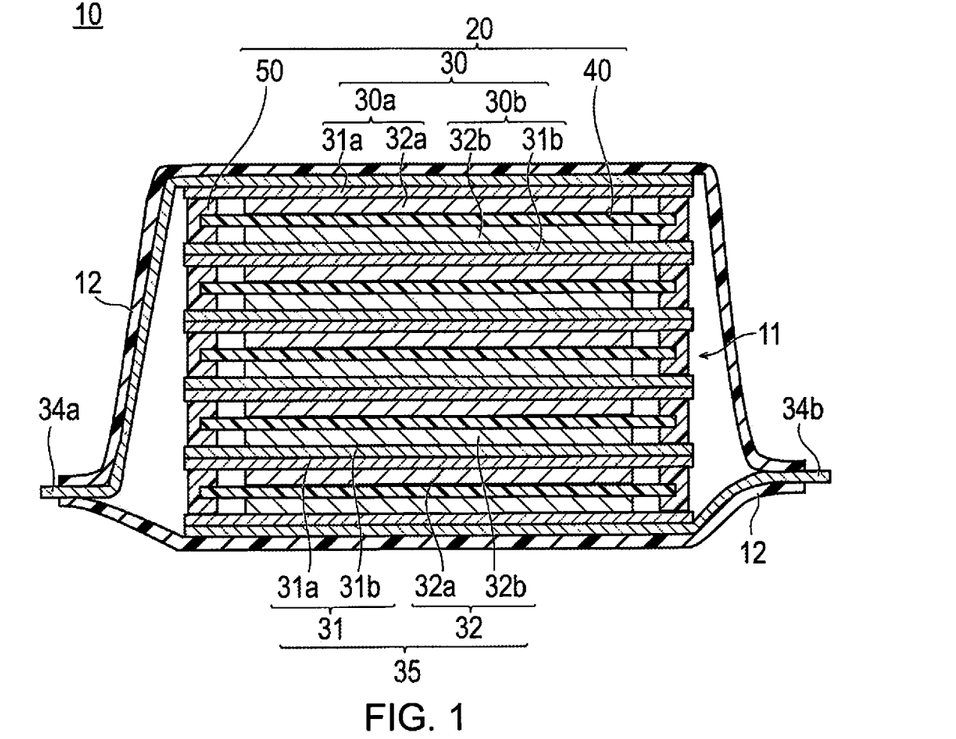
FIG. 1 is a cross-sectional diagram showing an overview of the overall structure of a battery according to one embodiment of the present invention.

FIG. 1 is a cross-sectional diagram in which a battery 10 according to one embodiment of the present invention is schematically represented. The battery 10 is preferably structured so that the power-generating element in which the charge/discharge reaction actually progresses is sealed inside an outer cladding 12, as shown in FIG. 1, in order to prevent impact from the outside and/or environmental degradation.

As shown in FIG. 1, the power-generating element in the battery 10 of the present embodiment is a stack 11 formed by a plurality of unit cells 20 being stacked. The power-generating element is also referred to as a "stack 11" below. The number of unit cells 20 that are stacked is preferably adjusted in accordance with a desired voltage.

As shown in FIG. 1, a positive electrode 30a and a negative electrode 30b constitute a bipolar electrode 35 in which an electrically coupled positive electrode active material layer 32a is formed on one surface of a current collector 31 and an electrically coupled negative electrode active material layer 32b is formed on the opposite surface of the current collector 31.

In FIG. 1, the current collector 31 is depicted as a stacked structure (two-layer structure) in which a positive electrode current collector 31a and a negative electrode current collector 31b are combined, but the current collector 31 can instead be a single-layer structure composed of a single material.

Furthermore, in the battery 10 shown in FIG. 1, a positive electrode current collector plate (positive electrode tab) 34a is disposed so as to be adjacent to the positive electrode-side current collector 31a, the positive electrode current collector plate 34a being extended and led out from the outer cladding 12. Moreover, a negative electrode current collector plate (negative electrode tab) 34b is disposed so as to be adjacent to the negative electrode-side current collector 31b, the negative electrode current collector plate 34b similarly being extended and led out from the outer cladding 12.

Unit Cell

Figure 2:
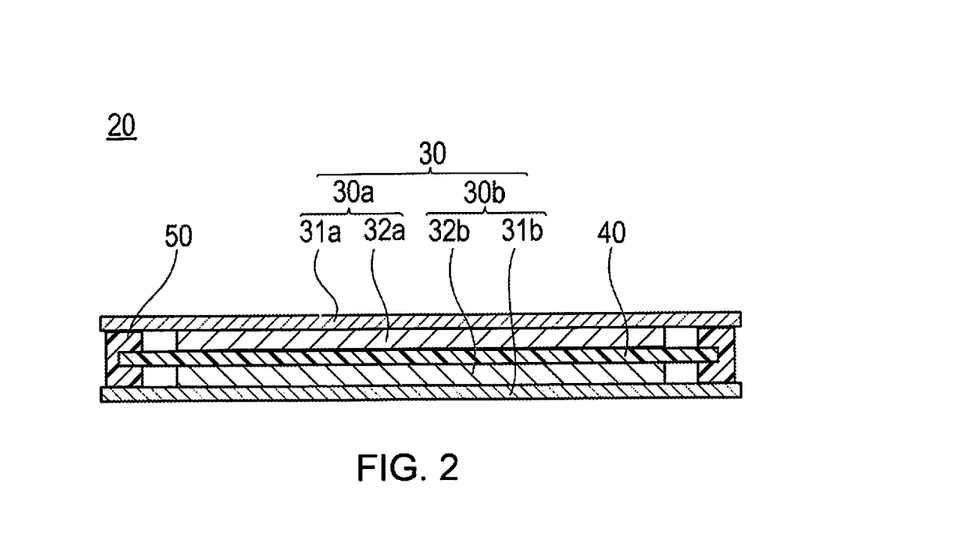
FIG. 2 is a cross-sectional diagram showing a unit cell of the secondary battery shown in FIG. 1.

As shown in FIG. 2, the unit cell 20 is configured by the positive electrode 30a and the negative electrode 30b being stacked with an electrolyte layer 40 interposed therebetween. The positive electrode 30a has a positive electrode active material layer 32a containing an electrolytic solution disposed on a positive electrode current collector 31a. The negative electrode 30b is formed by disposing a negative electrode active material layer 32b containing an electrolytic solution on a negative electrode current collector 31b.

The positive electrode active material layer 32a and the negative electrode active material layer 32b are disposed so as to face each other with the electrolyte layer 40 interposed therebetween. The positive electrode current collector 31a and the negative electrode current collector 31b are positioned at the outermost layers of the unit cell 20.

Seal parts 50 are disposed at outer peripheral portions of the unit cell 20. The seal parts 50 liquid-tightly seal the peripheries of the positive electrode active material layer 32a, the negative electrode active material layer 32b, and the electrolyte layer 40, preventing a liquid junction formed by leakage of the electrolytic solution. The positive electrode current collector 31a and the negative electrode current collector 31b are electrically separated from each other within the unit cell 20, preventing short-circuiting due to the positive electrode current collector 31a and the negative electrode current collector 31b coming into contact with each other.

Current Collector

The current collector 31 (adjacent ones of the positive electrode current collector 31a and the negative electrode current collector 31b) has a function for mediating transfer of electrons from one surface in contact with the positive electrode active material layer 32a to another surface in contact with the negative electrode active material layer 32b. The material constituting the current collector 31 is not particularly limited. For example, an electroconductive resin or metal can be used.

From the standpoint of reducing the weight of the current collector 31, the current collector 31 is preferably a resin current collector formed from an electroconductive resin. From the standpoint of blocking transfer of lithium ions between the unit cells 20, a metal layer can be provided to part of the resin current collector.

Specifically, examples of the electroconductive resin serving as the material that constitutes the resin current collector include resins in which an electroconductive filler is added, as needed, to an electroconductive polymer material or a non-electroconductive polymer material. Examples of the electroconductive polymer materials include polyaniline, polypyrrole, polythiophene, polyacetylene, polyparaphenylene, polyphenylenevinylene, and polyoxadiazole. Such electroconductive polymer materials are useful in terms of simplifying manufacturing steps and reducing the weight of the current collector due to having adequate electroconductivity even when no electroconductive filler is added.

Examples of the non-electroconductive polymer materials include polyethylene (PE, such as high-density polyethylene (HDPE) and low-density polyethylene (LDPE)), polypropylene, (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such non-electroconductive polymer materials can have exceptional potential resistance and solvent resistance.

Any electroconductive substance can be used as the electroconductive filler without particular limitation. Examples of materials having exceptional electroconductivity, potential resistance, and lithium-ion-blocking properties include metals and electroconductive carbons. The metals are not particularly limited. However, it is preferable to include at least one metal selected from the group consisting of nickel, titanium, aluminum, copper, platinum, iron, chromium, tin, zinc, indium, antimony, and potassium, or to include an alloy or metal oxide that includes these metals. The electroconductive carbons also are not particularly limited. It is preferable to include at least one selected from the group consisting of acetylene black, Vulcan®, Black Pearl®, carbon nanofiber, Ketjen Black®, carbon nanotubes (CNTs), carbon nanohorns, carbon nanoballoons, and fullerenes.

The amount of electroconductive filler added is not particularly limited, provided that the amount makes it possible to impart adequate electroconductivity to the current collector. The amount added is preferably about 5-35 vol %.

In cases where the current collector is formed from a metal, examples of the metal include aluminum, nickel, iron, stainless steel, titanium, and copper. Aside from these metals, a cladding material of nickel and aluminum, a cladding material of copper and aluminum, or a plating material of these metals can be preferably used. A foil can also be formed on the metal surface by coating with aluminum. Among these options, aluminum, stainless steel, copper, and nickel are preferred from the standpoint of, inter alfa, electron transmittivity, battery action potential, and close adhesiveness of the negative electrode active material through sputtering onto the current collector.

Electrode Active Material Layer (Positive Electrode Active Material Layer, Negative Electrode Active Material Layer)

Electrode active material layers (the positive electrode active material layer 32a, the negative electrode active material layer 32b) 32 include an electrode active material (the positive electrode active material or the negative electrode active material) and an electrolytic solution. The electrode active material layers 32 can also include a coating agent (the coating resin, the electroconductive auxiliary agent), an electroconductive member, etc., as needed. Furthermore, the electrode active material layers 32 can also include an ion-transmitting polymer, etc., as needed.

The electrolytic solution included in the electrode active material layers 32 functions as a dispersion medium for the electrode active material in a step for preparing a slurry (described below). From the standpoint of omitting a step for injecting the electrolytic solution in steps after formation of the electrode 30 and reducing the number of steps, the electrolytic solution in the electrode active material layers 32 preferably has the same composition as the electrolytic solution included in the electrolyte layer 40 of the battery 10.

The electrolytic solution has a form in which a lithium salt is dissolved in a solvent. Examples of the solvent constituting the electrolytic solution include ethylene carbonate (EC), propylene carbonate (PC), dimethyl carbonate (DMC), diethyl carbonate (DEC), ethyl methyl carbonate, and other carbonates. Examples of the lithium salt include: $LiPF_6$, $LiBF_4$, $LiSbF_6$, $LiAsF_6LiClO_4$, $Li[(FSO_2)_2N]$ (LiFSI), and other lithium salts of inorganic acids; and $LiN(CF_3SO_2)_2$, $LiN(C_2F_5SO_2)_2$, $LiC(CF_3SO_2)_3$, and other lithium salts of organic acids.

Positive Electrode Active Material

Examples of the positive electrode active material include: $LiMn_2O_4$, $LiCoO_2$, $LiNiO_2$, $Li(Ni—Mn—Co)O_2$, oxides in which some of the transition metals are substituted by other elements, and other lithium-transition metal composite oxides; lithium-transition metal phosphate compounds; and lithium-transition metal sulfate compounds. Depending on the situation, two or more positive electrode active materials can be used in combination. From the standpoint of capacity and output characteristics, it is preferable to use a lithium-transition metal composite oxide as the positive electrode active material. It is more preferable to use a composite oxide that contains lithium and nickel as the positive electrode active material. It is even more preferable to use $Li(Ni—Mn—Co)O_2$, oxides in which some of the transition metals are substituted by other elements (also referred to simply as "NMC composite oxides" below), lithium-nickel-cobalt-aluminum composite oxides (also referred to simply as "NCA composite oxides" below), etc. The NMC composite oxides have a layered crystal structure in which lithium atom layers and transition metal (with Mn; Ni, and Co arranged in an orderly manner) atom layers are alternatingly overlapped with oxygen atom layers interposed therebetween. One lithium atom is included per atom of transition metals, and the amount of lithium drawn out is twice that of spinel-based lithium manganese oxide; specifically, the supply capability is doubled, and it is possible to have high capacity.

Negative Electrode Active Material

Examples of the negative electrode active material include: graphite, soft carbon, hard carbon, and other carbon materials; lithium-transition metal composite oxides (e.g., $Li_4Ti_5O_{12}$); metal materials (tin, silicon); and lithium-alloy-based negative electrode materials (e.g., lithium-tin alloys, lithium-silicon alloys, lithium-aluminum alloys, lithium-aluminum-manganese alloys, etc.). Depending on the situation, two or more negative electrode active materials can be used in combination. From the standpoint of capacity and output characteristics, it is preferable to use a carbon material, a lithium-transition metal composite oxide, or a lithium-alloy-based negative electrode material as the negative electrode active material. As shall be apparent, negative electrode active materials other than those described above can also be used. (Meth)acrylate-based copolymers and other coating resins have properties that facilitate adhesion to carbon materials in particular. Therefore, from the standpoint of providing an electrode material that is structurally stabilized, it is preferable to use a carbon material as the negative electrode active material.

Electroconductive Auxiliary Agent

The electroconductive auxiliary agent is used as a coating agent that coats the surface of the electrode active material together with the coating resin. The electroconductive auxiliary agent can contribute to improvement in output characteristics at a high rate in the battery by forming an electron transmission path within the coating agent and reducing the electron transfer resistance of the electrode active material layers 32.

Examples of the electroconductive auxiliary agent include: aluminum, stainless steel, silver, gold, copper, titanium, and other metals, as well as alloys and metal oxides that include these metals; and graphite, carbon fiber (specifically vapor-grown carbon fiber (VGCF), etc.), carbon nanotubes (CNT), carbon black (specifically acetylene black, Ketjen Black®, furnace black, channel black, thermal lamp black, etc.), and other types of carbon. However, the electroconductive auxiliary agent is not limited to these examples. Substances in which a granular ceramic material or resin material is plated or otherwise coated with the metal materials described above can also be used as the electroconductive auxiliary agent. Among these electroconductive auxiliary agents, from the standpoint of electrical stability, it is preferable to include at least one selected from the group consisting of aluminum, stainless steel, silver, gold, copper, titanium, and carbon, more preferable to include at least one selected from the group consisting of aluminum, stainless steel, silver, gold, and carbon, and even more preferable to include at least one carbon. One of these electroconductive auxiliary agents can be used alone, or two or more can be used in combination.

The electroconductive auxiliary agent preferably has a particulate or fibrous form. In cases where the electroconductive auxiliary agent is a particulate, the form of the particles is not particularly limited. Any form, such as a fine-powder form, a spherical form, a rod form, a needle form, a plate form, a columnar form, an irregular form, a scale form, or a fusiform, can be employed. The average particle diameter (primary particle diameter) in cases where the electroconductive auxiliary agent has a particulate form is preferably no more than 100 nm. In this specification, "particle diameter" refers to the greatest distance from among distances between any two points on the contour of the electroconductive auxiliary agent. A value calculated as the average value of the particle diameters of particles observed in several or several tens of fields of view using a scanning electron microscope (SEM), a transmission electron microscope (TEM), or another observation means is employed as the value of the "average particle diameter."

Electroconductive Member

The electroconductive member has a function for forming an electron transmission path within the electrode active material layers 32. In particular, at least part of the electroconductive member preferably forms an electroconductive passage via which two primary surfaces of the electrode active material layers 32 are electrically connected to each other. Having such a form further reduces the electron transfer resistance in a thickness direction of the electrode active material layers 32, and therefore the output characteristics can be even further improved at a high rate in the battery. It is possible to confirm, by observing a cross-section of the electrode active material layers 32 using a SEM or an optical microscope, whether at least part of the electroconductive member forms an electroconductive passage via which the two primary surfaces of the electrode active material layers 32 are electrically connected to each other.

The electroconductive member is preferably electroconductive fiber having a fibrous form. Specific examples include: PAN-based carbon fiber, pitch-based carbon fiber, and other carbon fiber; electroconductive fiber obtained by uniformly dispersing a highly electroconductive metal or graphite in synthetic fiber; metal fiber in which a metal such as stainless steel is formed into fiber; electroconductive fiber in which the surface of organic fiber is coated with a metal; and electroconductive fiber in which the surface of organic fiber is coated with a resin that contains an electroconductive substance. Among these fibers, carbon fiber is preferred due to having exceptional electroconductivity and low weight.

In the battery 10 of the present embodiment, a thickness of the electrode active material layers 32, as pertains to the positive electrode active material layer 32a, is preferably 150-1500 μm, more preferably 180-950 μm, and even more preferably 200-800 μm. A thickness of the negative electrode active material layer 32b is preferably 150-1500 μm, more preferably 180-1200 μm, and even more preferably 200-1000 μm. If the thickness of the electrode active material layers 32 is a value equal to or greater than the lower-limit value described above, the energy density of the battery can be adequately raised. If the thickness of the electrode active material layers 32 is a value equal to or less than the upper-limit value described above, the structure of the electrode active material layers 32 can be adequately maintained.

In the battery 10 of the present embodiment, other than the electrode active material, as well as the electroconductive member, the ion-transmitting polymer, the lithium salt, and the coating agent (coating resin, electroconductive auxiliary agent), which are used as needed, other members can be used, as appropriate, as constituent members of the electrode active material layers 32. However, from the standpoint of improving the energy density of the battery, it is preferable not to incorporate members that do not contribute much to the progression of the charge/discharge reaction. For example, use of a binder that is added in order to bind the electrode active material and other members and maintain the structure of the electrode active material layers 32 is preferably avoided as much as possible. Examples of binders having the functions described above include polyvinylidene fluoride (PVdF) and other solvent-based binders, and styrene-butadiene rubber (SBR) and other water-based binders. Specifically, the binder content is preferably 10 mass % or less, more preferably 5 mass % or less, even more preferably 2 mass % or less, particularly preferably 1 mass % or less, and most preferably 0 mass % relative to 100 mass % of the total solid content included in the electrode active material layers 32.

Electrolyte Layer

The electrolyte layer 40 is a layer in which an electrolyte is held by a separator, the electrolyte layer 40 being disposed between the positive electrode active material layer 32a and the negative electrode active material layer 32b, and preventing direct contact between these two layers. The electrolyte used in the electrolyte layer 40 of the present embodiment is not particularly limited. Examples include electrolytic solutions and gel polymer electrolytes. Using these electrolytes can ensure lithium ion transmission properties.

The same electrolytic solution as is used in the electrode active material layers 32 described above can be used in the electrolyte layer 40. The concentration of the lithium salt in the electrolytic solution is preferably 0.1-3.0 M, and more preferably 0.8-2.2 M. The amount used in cases where additives are used is preferably 0.5-10 mass %, and more preferably 0.5-5 mass %, relative to 100 mass % of the electrolytic solution before the additives are added.

Examples of additives include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyl oxymethyl ethylene carbonate, acryloxymethyl ethylene carbonate, methacryloxymethyl ethylene carbonate, ethynyl ethylene carbonate, propargyl ethylene carbonate, ethynyl oxymethyl ethylene carbonate, propargyl oxyethylene carbonate, methylene ethylene carbonate, and 1,1-dimethyl-2-methylene ethylene carbonate. Among these additives, vinylene carbonate, methyl vinylene carbonate, and vinyl ethylene carbonate are preferred, and vinylene carbonate and vinyl ethylene carbonate are more preferred. One of these cyclic carbonate esters can be used alone, or two or more can be used in combination.

The gel polymer electrolyte has a configuration obtained by injecting the electrolytic solution described above into a matrix polymer (host polymer) composed of an ion-transmitting polymer. Using a gel polymer electrolyte as the electrolyte eliminates fluidity of the electrolyte and is exceptional in terms of simplicity due to blocking the transmission of ions between layers. Examples of the ion-transmitting polymer used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HFP), polymethyl methacrylate (PMMA), and copolymers of these.

The matrix polymer of the gel polymer electrolyte forms a cross-linked structure, thereby making it possible to realize exceptional mechanical strength. A suitable polymerization initiator is used in forming the cross-linked structure. Heat-induced polymerization, UV-ray-induced polymerization, radiation-induced polymerization, electron-beam-induced polymerization, or another polymerization process is to be implemented on a polymerizable polymer (e.g., PEO or PPO) for forming a polymer electrolyte.

The separator has a function for holding the electrolyte to ensure lithium ion transmission properties between the electrode 30a and the electrode 30b, and a function for forming a partition between the electrode 30a and the electrode 30b.

Examples of the form of the separator can include porous-sheet separators composed of a polymer or fiber that absorbs and holds the electrolyte, and non-woven-fabric separators.

Positive Electrode Current Collector Plate and Negative Electrode Current Collector Plate The material constituting the current collector plates 34a, 34b is not particularly limited. Well-known electroconductive materials that are conventionally used as current collector plates in lithium ion secondary batteries can be used. The material constituting the current collector plates 34a, 34b is preferably, e.g., aluminum, copper, titanium, nickel, stainless steel, alloys of these, or other metal materials. From the standpoint of low weight, high corrosion resistance, and high electroconductivity, aluminum and copper are more preferred, and aluminum is particularly preferred. In each of the positive electrode current collector plate 34a and the negative electrode current collector plate 34b, the same material or different materials can be used.

Seal Parts

The seal parts 50 have a function for preventing contact between the current collectors 31 and preventing short-circuiting in end parts of the unit cells 20. The material constituting the seal parts 50 is to have insulation properties, sealing properties (liquid-tightness), heat resistance at temperatures at which the battery operates, etc. For example, acrylic resins, urethane resins, epoxy resins, polyethylene resins, polypropylene resins, polyimide resins, and rubbers (ethylene-propylene-diene rubber: EPDM) can be used. In addition, isocyanate-based adhesives, acrylic-resin-based adhesives, cyanoacrylate-based adhesives, etc., can be used, and hot-melt adhesives (urethane resins, polyamide resins, polyolefin resins), etc., can also be used. Among these materials, polyethylene resins and polypropylene resins are preferably used as the material constituting an insulating layer from the standpoint of corrosion resistance, chemical resistance, ease of handling (film formability), economy, etc. A resin in which ethylene, propylene, and butene are copolymerized and which has an amorphous polypropylene resin as a main component is preferably used.

Outer Cladding

In the present embodiment shown in FIG. 1, the outer cladding 12 is configured in the form of a bag from a laminate film, but the present invention is not limited to this configuration. For example, a well-known metal can case, etc., can be used. The outer cladding 12 is preferably configured from a laminate film from the standpoint of exceptional increases in output and cooling performance, as well as from the standpoint of making it possible to appropriately use the battery 10 as a battery for a large-scale apparatus such as an EV or a HEV. Examples of laminate films that can be used include those obtained by laminating polypropylene (PP), aluminum, and nylon in the stated order to yield a three-layer structure, but the present invention is in no way limited to these materials. In addition, the group pressure applied to the stack 11 from the outside can easily be adjusted, and the electrolyte layer 40 is easily adjusted to a desired thickness; therefore, the outer cladding 12 is preferably an aluminate laminate.

Method for Manufacturing Battery

One aspect of the present invention pertains to a method for manufacturing a battery. A battery manufactured using the battery manufacturing method according to the present embodiment can be used as a non-aqueous-electrolyte secondary battery such as the bipolar battery according to the embodiment described above.

Figure 3:
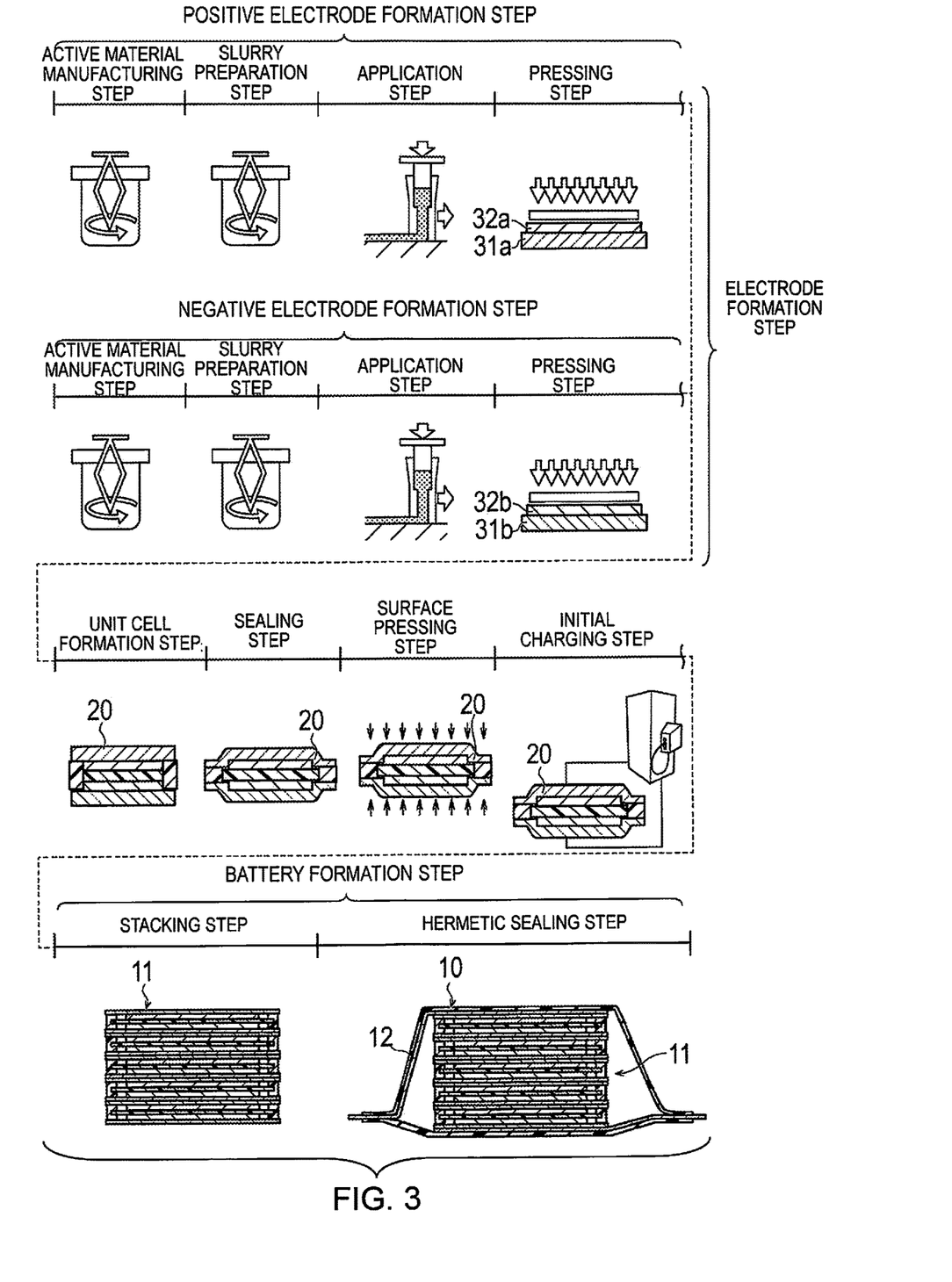
FIG. 3 is an overview diagram showing one example of a series of steps in a battery manufacturing method according to one embodiment of the present invention.
Figure 4:
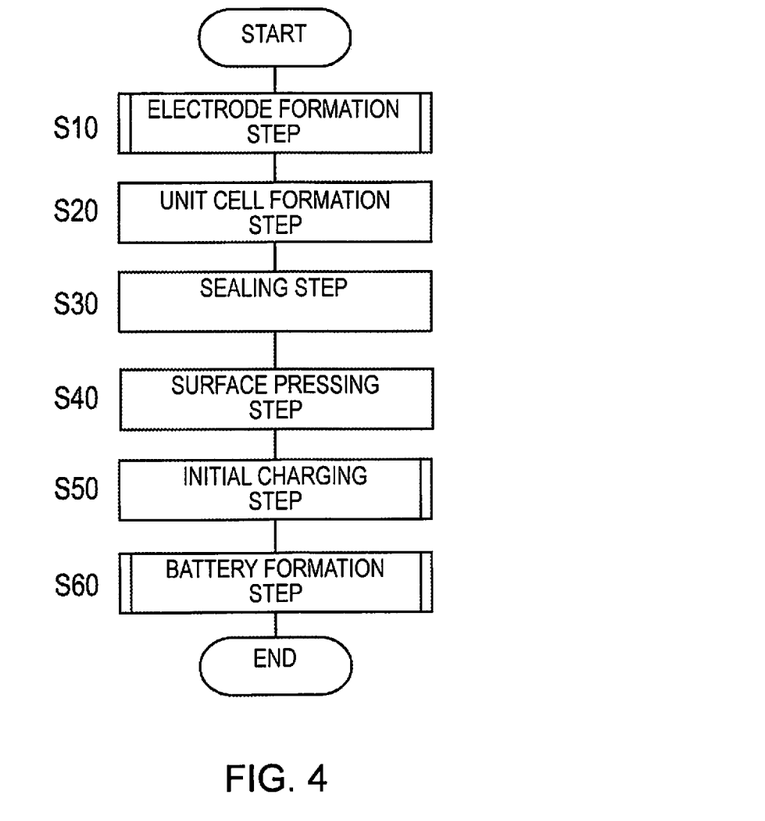
FIG. 4 is a flow chart for illustrating the battery manufacturing method according to one embodiment of the present invention.
Figure 5:
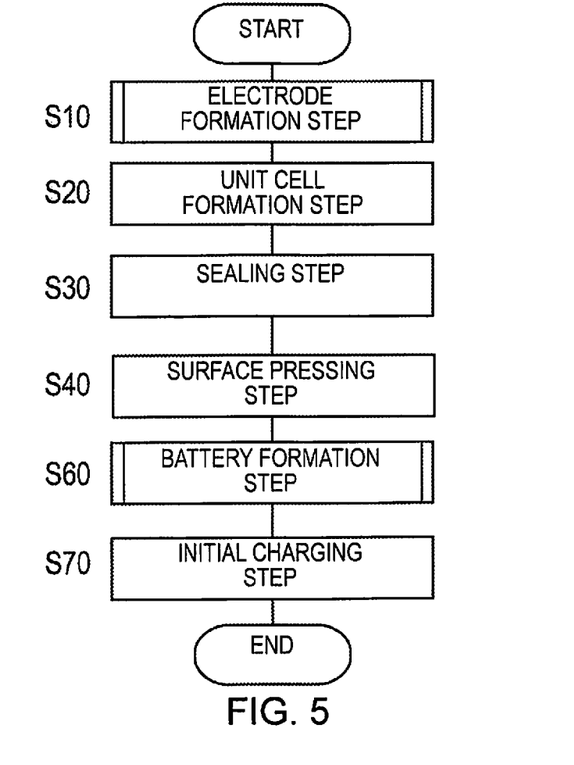
FIG. 5 is a flow chart for illustrating the battery manufacturing method according to another embodiment of the present invention.

FIG. 3 is an overview diagram showing one example of a series of steps in a method for manufacturing a battery 10 according to the present embodiment. FIG. 4 is a flow chart for illustrating the method for manufacturing a battery 10 according to the present embodiment. FIG. 5 is a flow chart for illustrating the battery manufacturing method according to another embodiment.

The method for manufacturing a battery 10 has an electrode formation step (S10), a unit cell formation step (S20), a sealing step (S30), a surface pressing step (S40), an initial charging step (S50), and a battery formation step (S60), as shown in FIGS. 3 and 4.

In the method for manufacturing a battery 10 shown in FIGS. 3 and 4, an initial charging step (S50) for the unit cell 20 is performed before the battery formation step (S60), but the present invention is not limited to this configuration. The initial charging step (S70) can be performed after the battery formation step (S60), as shown in FIG. 5. A single initial charging step (S70) is thus carried out, therefore making it possible to reduce the number of manufacturing steps to a greater extent than in cases where initial charging is performed for each unit cell 20. In addition, in the electrode formation step (S10) shown in FIG. 3, an example is shown in which an application film obtained through an application step is cut into segments that are then pressed one at a time, but the present invention is not limited to this configuration. The application step and a pressing step can be performed continuously using a roll-to-roll process.

The method for manufacturing a battery 10 according to the present embodiment necessarily includes: the surface pressing step (S40) for bringing a pressing surface of a pressing part into surface contact with one unit cell 20 or with two or more stacked unit cells 20 from the stacking direction and applying pressure; and, after the surface pressing step (S40), the initial charging step (S50) for charging the one unit cell 20 or the two or more stacked unit cells 20. In the method for manufacturing a battery 10 according to the present embodiment, pressing the surfaces of the unit cell 20 from the stacking direction in the surface pressing step (S40) makes it possible to fix the thickness of the unit cell 20 and adjust the distance between electrodes (distance between surfaces of active material layers). Pressing the surfaces also makes it possible to flatten creases (irregularities) formed in the current collector 31 or the separator. Molding the unit cell 20 by means of such a surface pressing step (S40) before the initial charging step (S50) makes it possible to reduce the internal resistance of the battery.

The method for manufacturing a battery 10 according to the present invention is described in detail below so as to include the characteristics described above.

Electrode Formation Step

Figure 6:
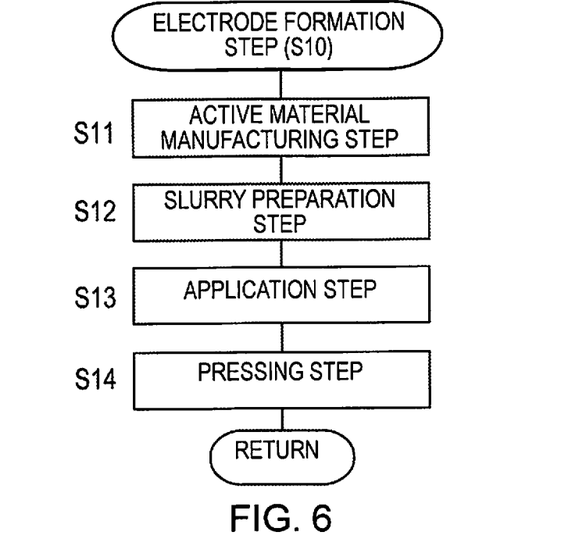
FIG. 6 is a subroutine flow chart for the electrode formation step (S10) shown in FIG. 4.

The electrode formation step (S10) is described first with reference to FIG. 6. FIG. 6 is a subroutine flow chart for the electrode formation step (S10) shown in FIG. 4. As shown in FIG. 6, the electrode formation step (S10) according to the present embodiment preferably includes an active material manufacturing step (S11), a slurry preparation step (S12), an application step (S13), and a pressing step (S14).

Active Material Manufacturing Step

The coated electrode active material is manufactured in the active material manufacturing step. The method for manufacturing a coated electrode active material is not particularly limited. Examples include the following method. First the electrode active material is introduced into an all-purpose mixer and is stirred at a speed of 10-500 rpm, and a solution (coating resin solution) that contains a coating resin and a solvent is added dropwise to the mixture over a period of 1-90 minutes. Methanol, ethanol, isopropanol, or other alcohols can be suitably used as the solvent in this instance. The electroconductive auxiliary agent is then furthermore added and mixed in. The temperature is then raised to 50-200° C. while the stirring is performed, and the pressure is reduced to 0.007-0.04 MPa, after which these conditions are maintained for 10-150 minutes, thereby making it possible to obtain a coated electrode active material.

Slurry Preparation Step

The electrode active material and the electrolytic solution, which is a dispersion medium, are mixed to prepare an electrode active material slurry. The electrode active material slurry is a mixture that necessarily includes the electrode active material and the electrolytic solution. As pertains to the specific configuration (type, content, etc.) of the solid content ((coated) electrode active material, electroconductive member, ion-transmitting polymer, lithium salt, etc.) included in the electrode active material slurry, the same configuration as was described above can be employed, and therefore detailed description of this configuration is omitted here. Small amounts of a binder can also be added, as needed, to an application liquid. However, as indicated above, the binder content in the application liquid is preferably 10 mass % or less, more preferably 5 mass % or less, even more preferably 2 mass % or less, particularly preferably 1 mass % or less, and most preferably 0 mass % relative to 100 mass % of the total solid content included in the electrode active material layers 32.

The electrolytic solution (dispersion medium) constituting the electrode active material slurry is eventually used as a electrolytic solution constituting the electrode active material layers 32. Because the electrolytic solution (dispersion medium) constituting the electrode active material slurry is the same as the electrolytic solution constituting the electrode active material layers 32, detailed description of the electrolytic solution is omitted here.

The method for mixing the components included in the electrode active material slurry and preparing the electrode active material slurry is not particularly limited. Conventionally well-known expertise can be referred to, as appropriate, with respect to the sequence for adding the members, the method for carrying out mixing, etc. However, because the solid content concentration of the electrode active material slurry is comparatively high, it is preferable to use a mixer that can impart high shear as the mixer for mixing the materials. Specifically, a planetary mixer, a kneader, a homogenizer, an ultrasonic homogenizer, a disperser, or another bladed stirrer is preferred, and a planetary mixer is particularly preferred form the standpoint of churning in particular. The specific method for mixing is also not particularly limited, but it is preferable to implement churning at a higher solid content concentration than the final solid content concentration, subsequently add a dispersion medium component, and then carry out further mixing to thereby prepare the electrode active material slurry. The mixing time is not particularly limited. Uniform mixture is to be achieved. As an example, churning and subsequent mixing are each to be performed in about 10-60 minutes, and each step can be carried out once or a plurality of times.

Application Step

In the application step, the electrode active material slurry obtained as described above is applied to the surfaces of the current collector 31 to form application films. The application films eventually constitute the electrode active material layers.

A thickness of the application films obtained by applying the electrode active material slurry in the application step is not particularly limited, and should be set as appropriate so that the aforementioned thickness of the electrode active material layers is achieved.

Application means for implementing the application in the application step is not particularly limited, and conventionally well-known application means can be used as appropriate. Among such application means, application means with which it is possible to apply the electrode active material slurry at an application speed at which comparatively high shear force can be imparted during application are preferred from the standpoint of obtaining application films (electrode active material layers) that have a highly flat surface by applying the electrode active material slurry, which has a high solid content concentration. Among these application means, an application process performed by a slit-die coater that spreads out the electrode active material slurry from slits and applies the slurry is one example of an optimal application means due to yielding exceptional application of a thin film and exceptional uniformity in application thickness.

In the application step according to the present embodiment, after the electrode active material slurry is applied and the application films are obtained, the resultant application films are not subjected to any drying process performed through heating. This makes it possible to suppress cracking of the electrode active material layers and reduce manufacturing costs required for a drying process. In cases where the electrode active material slurry is not subjected to heating and drying after application, it is difficult to cut out an electrode in a desired area after the application of the electrode active material slurry. Thus, in the method for manufacturing a battery 10 according to the present embodiment, it is necessary to apply the electrode active material slurry to the surface of the current collector in such a manner as to reach the desired area. Therefore, a masking process or other process can be implemented in advance on the surface of the current collector other than a portion subject to application.

Pressing Step

In the method for manufacturing a battery 10 according to the present embodiment, a pressing process can also be performed on the application films obtained through the application of the electrode active material slurry. When the pressing process is implemented, it is preferable to press the surface of the application films in a state in which a porous sheet is disposed thereon. Through implementing such a pressing process, electrode active material layers having higher uniformity of surface are obtained. The porous sheet is used for, inter alia, the purpose of preventing the slurry from adhering to a pressing device when the application films are pressed, or the purpose of absorbing excess electrolytic solution that percolates out during pressing. Therefore, the material and form of the porous sheet are not particularly limited, provided that the aforementioned purpose can be achieved.

As one example, a sheet that is used as a separator in this technical field and that is similar to a microporous film or a non-woven fabric can be used as the porous sheet. Specifically, examples of the microporous film include: microporous films composed of polyimide, aramid, polyvinylidene fluoride-hexafluoropropylene (PVdF-HFP), and other hydrocarbon-based resins; and microporous films composed of glass fiber, etc. Examples of the non-woven fabric include non-woven fabrics in which the following are used alone or in a mixture: cotton, rayon, acetate, nylon, or polyester; PP, PE, or other polyolefins; and polyimide or aramid.

The porous sheet can be taken out after pressing, or can be used as a separator in the battery 10 without further modification. In cases where the porous sheet is used as a separator without further modification after pressing, the electrolyte layer can be formed with only the porous sheet as a separator, or the electrolyte layer can be formed such that the porous sheet and another separator are combined (specifically, there can be two or more separators).

The pressing device for implementing the pressing process is preferably a device in which pressure is uniformly applied to the entire surface of the application films. The pressure applied per unit area of the application films during pressing is not particularly limited. However, the pressure is preferably 0.01-2 MPa, and more preferably 0.1-1 MPa. When the pressure is within this range, it is possible to easily realize a void ratio and a density of the electrode active material layers 32 according to the preferred embodiment described above.

Unit Cell Formation Step

In the unit cell formation step (S20), the positive electrode 30a, the negative electrode 30b, and the separator are stacked so that the positive electrode active material layer 32a of the positive electrode 30a and the negative electrode active material layer 32b of the negative electrode 30b face each other with the separator interposed therebetween, forming the unit cell 20, as shown in FIG. 2. In this instance, the seal parts 50 are interposed between the outer peripheral portions of the positive electrode current collector 31a and the outer peripheral portions of the negative electrode current collector 31b. The seal parts 50 are preferably disposed in a frame shape along the outer peripheral portions of the current collector 31. The seal parts 50 can be disposed further outward in the planar direction than the outer peripheral portions of the current collector 31.

As indicated in the present embodiment, in cases of electrode active material layers 32 containing an electrolytic solution, the electrode active material layers 32 are wet, and therefore the separator readily clings to the electrode active material layers 32 in the unit cell formation step and creases are likely to remain in the separator. If the electrode active material layers are instead dry, the electrolyte layer does not cling to the electrode active material layers 32, and creases can easily be smoothed out. In addition, because the electrode active material layers 32 are soft, creases readily form in the surface of the current collector 31. In particular, in cases where the area of the electrodes 30 is high, creases more readily form in the separator and the current collector 31. A method for eliminating creases formed in the separator and the current collector 31 is described in detail in the description of the stacking step (S61).

Sealing Step

In the sealing step (S30), the outer peripheral portions of the electrodes 30 that include the seal parts 50 are sealed. Sealing means is not particularly limited, but heat sealing is preferably used from the standpoint of reliability over extended periods. The sealing step is preferably performed in an atmosphere under a substantially evacuated state. Employing a substantially evacuated state makes it possible to efficiently prevent outside air from infiltrating into a region bounded by the current collector 31 and the seal parts 50 of the unit cell 20, and carry out hermetic sealing. A device for implementing the sealing step is not particularly limited. A conventionally well-known heat sealer can be used as appropriate.

In cases where the current collector 31 is a resin current collector formed from a resin, there is a possibility that the current collector 31 will compress in the sealing step due to heat during the heat sealing, and that creases will be formed in the current collector 31 positioned at a surface layer of the unit cell 20. Performing the surface pressing step (S40) after the sealing step as described below makes it possible to flatten irregularities in the surface of the unit cell 20.

Surface Pressing Step

In the surface pressing step (S40), a pressing surface of a pressing part is brought into surface contact with one unit cell 20 or with two or more stacked unit cells 20 from the stacking direction and pressure is applied. The "surface of the unit cell 20" refers to a surface that intersects the stacking direction from among outer surfaces of the unit cell 20. In the surface pressing step, it is preferable to press the unit cells 20 one at a time from the standpoint of reliably molding the unit cells 20, but the present invention is not limited to this configuration. A plurality of unit cells 20 can be pressed and molded simultaneously.

Figure 7:
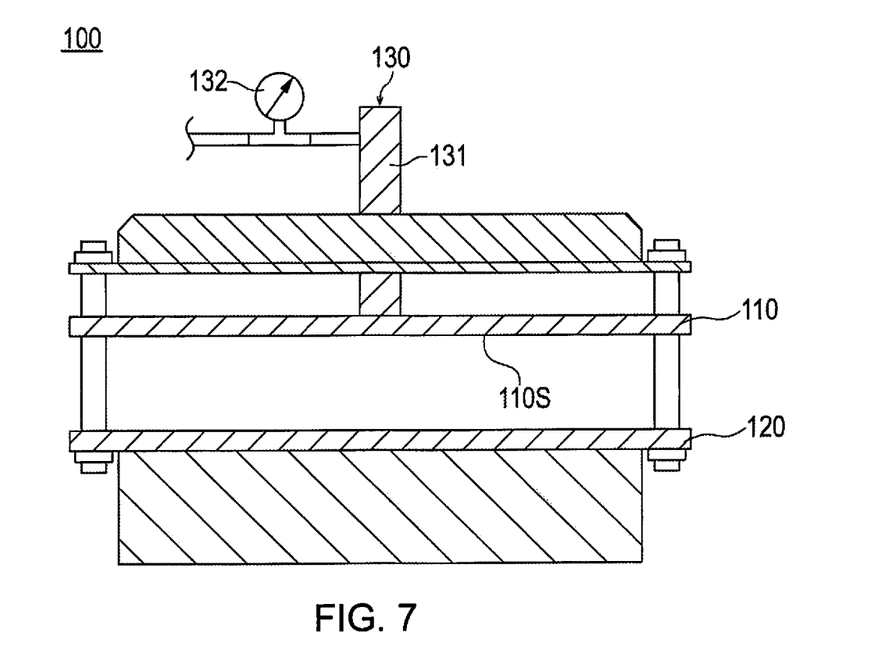
FIG. 7 is a cross-sectional diagram showing one example of a surface press device used in a surface pressing step (S40)

The surface press device for implementing the surface pressing step is not particularly limited, provided that the surface press device has a pressing part comprising a pressing surface. A conventionally well-known surface press device can be used as appropriate. For example, a surface press device 100 such as is shown in FIG. 7 can be used. The surface press device 100 has a pressing part 110 comprising a pressing surface 110S, and also has a placement platform 120 and a drive unit 130.

Figure 8:
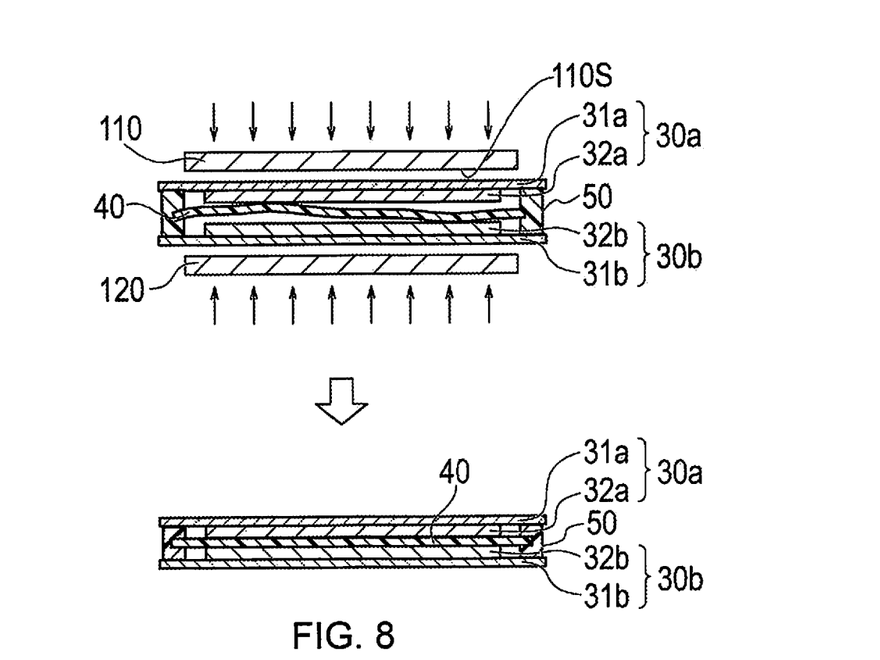
FIG. 8 is a cross-sectional diagram schematically showing the surface pressing step (S40) according to one embodiment of the present invention.

The pressing part 110 comprises the pressing surface 110S, which is arranged substantially parallel to the surface of the unit cell 20. The pressing surface 110S of the pressing part 110 preferably comes into surface contact with the entirety of the surface of the unit cell 20, as shown in FIG. 8. In cases where the surface of the unit cell 20 is instead partially pressed, there is a possibility that unequal load will be applied and that defects will be produced such as non-uniformity in the thickness of the unit cell 20 and increases in resistance. Implementing surface contact with the entire surface makes it possible to equally add pressure to the unit cell 20, therefore making it possible to make the thickness of the unit cell 20 uniform.

The drive unit 130 comprises, for example, a cylinder 131 that drives the pressing part 110 using hydraulic pressure or another type of fluid pressure so that the pressing part 110 approaches and moves away from the unit cell 20 placed on the placement platform 120, and a pressure gauge 132 that measures a fluid pressure of a fluid supplied to the cylinder 131. The fluid pressure within the cylinder 131 is controlled on the basis of a value from the pressure gauge 132, thereby making it possible to adjust the pressing force of the pressing part 110.

In the surface pressing step, the pressure used when pressing the unit cell 20 is preferably 9.8-39.2 (Pa), more preferably 14.7-39.2 (Pa), and even more preferably 14.7-29.4 (Pa). In cases where the battery 10 according to the present embodiment is used as a power source for a vehicle such as an electric vehicle, a hybrid electric vehicle, a fuel-cell vehicle, or a hybrid fuel-cell electric vehicle, the pressure applied to the unit cell 20 of the battery 10 mounted in the vehicle is about 9.8 (Pa). In cases where the pressure in the surface pressing step is instead lower than the pressure applied when the battery 10 is mounted in a vehicle, there is a possibility that the unit cell 20 molded in the surface pressing step will deform due to pressure applied when the battery 10 is mounted in the vehicle. Increasing the pressure in the surface pressing step also makes it possible to adjust the thickness of the unit cell 20 and reduce resistance in a short period of time. Therefore, the manufacturing time can be shortened. However, when the pressure is excessively increased, there is a possibility that the separator will break and short-circuiting will occur. Therefore, if the pressure used when pressing the unit cell 20 is a value equal to or greater than the lower-limit value described above, deformation when the battery 10 is mounted in a vehicle can be suppressed, and the time required for molding the unit cell 20 can also be shortened. Moreover, if the pressure used when pressing the unit cell 20 is a value equal to or less than the upper-limit value described above, damage to the separator due to the surface pressing step can be prevented.

Initial Charging Step

The initial charging step is described next. The initial charging step is performed after the surface pressing step (S40). Provided that the initial charging step is performed after the surface pressing step (S40), the initial charging step can be performed between the unit cell formation step (S20) and the battery formation step (S60) as shown in FIG. 4, or after the battery formation step (S60) as shown in FIG. 5.

In the initial charging step, the unit cell 20 obtained in the unit cell formation step (S20) or the battery 10 obtained in the battery formation step (S60) is subjected to initial charging. The initial charging is preferably performed while pressure is applied to the unit cell 20 or the battery 10. The pressure used when pressing the unit cell 20 or the battery 10 in the initial charging step is preferably about equal to the pressure used when pressing the unit cell 20 in the surface pressing step.

In cases where the unit cell 20 is instead molded in the surface pressing step after the initial charging step, the initial charging will be performed in a state in which the thickness of the unit cell 20 is non-uniform or in which creases remain. Therefore, there is a possibility that the unit cell 20 will deform excessively due to unbalanced generation of gas and/or changes in volume during initial charging. An excessively deformed unit cell 20 will not be readily molded after the initial charging step. Therefore, the internal resistance of the battery can increase. Performing the initial charging after the unit cell 20 is molded in the surface pressing step as indicated in the present embodiment makes it possible to suppress excessive deformation of the unit cell 20 and reduce the internal resistance of the battery.

Battery Formation Step

Figure 9:
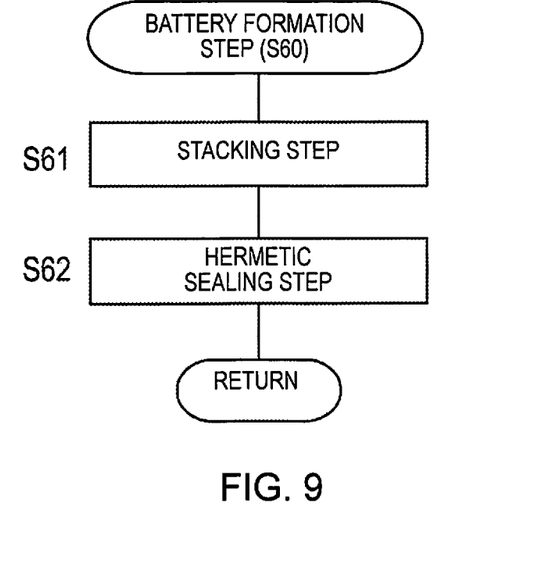
FIG. 9 is a subroutine flow chart for the battery formation step (S60) shown in FIG. 4.

The battery formation step (S60) according to the present embodiment is described next with reference to FIG. 9. FIG. 9 is a subroutine flow chart for the battery formation step (S60) shown in FIG. 4. The battery formation step (S60) according to the present embodiment has a stacking step (S61) and a hermetic sealing step (S62).

Stacking Step

In the stacking step (S61), a plurality of unit cells 20 are stacked to form a stack 11 that is a power-generating element.

Hermetic Sealing Step

In the hermetic sealing step (S62), the stack 11 that is a power-generating element is sealed inside the outer cladding 12. This makes it possible to obtain the battery 10 as shown in FIG. 1.

A method for sealing the stack 11 inside the outer cladding 12 in the hermetic sealing step is not particularly limited. For example, in cases where the outer cladding 12 is a laminate film, examples of the method include a method for coating the stack 11 so as to sandwich the same from both sides along the stacking direction, and sealing end parts through use of thermal fusion, etc. In cases where the outer cladding 12 is a metal can case, examples of such methods include a method for accommodating the stack 11 inside the metal can case, air-tightly shutting the metal can case, and then using a well-known pressure-reducing device to reduce the pressure inside the metal can case.

The method for manufacturing a battery 10 according to one embodiment of the present invention as described above exhibits the following effects.

The method for manufacturing a battery 10 has: a surface pressing step for bringing a pressing surface of a pressing part into surface contact with one unit cell 20 or with two or more stacked unit cells 20 from the stacking direction and applying pressure; and an initial charging step for charging the one unit cell 20 or the two or more stacked unit cells 20, the initial charging step being carried out after the surface pressing step.

According to the method for manufacturing a battery 10, pressing the surface makes it possible to flatten creases (irregularities) formed in the current collector 31 and the separator. Molding the unit cell 20 through such surface pressing before the initial charging step makes it possible to suppress excessive deformation of the unit cell in the initial charging step and reduce the internal resistance of the battery 10.

In cases where the current collector 31 is a resin current collector, the method preferably furthermore has a sealing step for sealing outer peripheral portions of the resin current collector before the surface pressing step. In cases where the current collector 31 is a resin current collector, there is a possibility that the current collector 31 will compress in the sealing step due to heat during the heat sealing, and that creases will be formed in the current collector 31 positioned at a surface layer of the unit cell 20. Performing the surface pressing step (S40) after the sealing step as described below makes it possible to flatten irregularities in the surface of the unit cell 20.

In the surface pressing step, the pressure used when pressing the unit cell 20 is preferably 14.7-39.2 (Pa). Setting the pressure used when pressing the unit cell 20 so as to be greater than about 9.8 (Pa), which is the pressure applied when the battery 10 is mounted in a vehicle, makes it possible to suppress deformation due to pressure applied when the unit cell 20 is mounted in a vehicle. Setting the pressure so as to be equal to or less than 39.2 (Pa) makes it possible to suppress damage to the separator and the occurrence of short-circuiting.

The binder content of the electrode active material layers 32 in the electrodes 30 is preferably 1 mass % or less relative to 100 mass % of the total solid content. This reduces the binder content or eliminates the binder, thereby making it possible to improve the energy density of the battery. Because the electrode active material layers 32 are soft, there is a possibility that the thickness of the unit cell 20 will become non-uniform in cases where the unit cell 20 is not pressed and molded after formation. Therefore, pressing the surface of the unit cell 20 and molding the unit cell 20 before the initial charging step as in the present embodiment makes it possible to reduce the internal resistance of the battery 10.

EXAMPLES

The present invention is described in further detail below through examples. However, the technical scope of the present invention is in no way limited to only the examples described below.

Comparative Example 1

Creation of Resin Solution for Coating Negative Electrode Active Material 83 parts of ethyl acetate and 17 parts of methanol were charged into a four-neck flask fitted with a stirrer, a temperature gauge, a reflux cooling pipe, a dropping funnel, and a nitrogen gas introduction pipe, and the temperature was raised to 68° C.

A liquid monomer compound in which 242.8 parts of methacrylic acid, 97.1 parts of methyl methacrylate, 242.8 parts of 2-ethylhexyl methacrylate, 52.1 parts of ethyl acetate, and 10.7 parts of methanol were compounded, and an initiator solution in which 0.263 parts of 2,2'-azobis(2,4-dimethylvaleronitrile) was dissolved in 34.2 parts of ethyl acetate, were next continuously added dropwise under stirring into the four-neck flask over the course of four hours using the dropping funnel while nitrogen was blown into the four-neck flask, and radical polymerization was carried out. After dropwise addition was complete, an initiator solution in which 0.583 parts of 2,2'-azobis(2,4-dimethylvaleronitrile) was dissolved in 26 parts of ethyl acetate was continuously added over the course of two hours using the dropping funnel. Polymerization was furthermore continued for four hours at a boiling point. After a solvent was removed and 582 parts of a resin was obtained, 1,360 parts of isopropanol was added, and a resin solution for coating the negative electrode active material was obtained, the resin solution being composed of a vinyl resin having a resin solid content concentration of 30 mass %.

Creation of Coated Negative electrode Active Material 88.4 parts of hardly graphitizable carbon (hard carbon) (Carbotron® PS(F) (Kureha Battery Materials Japan) was introduced into an all-purpose mixer, the resin solution for coating the negative electrode active material (resin solid content concentration: 30 mass %) obtained as described above was added dropwise and mixed over the course of 60 minutes in an amount of 10 parts in terms of resin solid content in a state in which stirring was carried out at room temperature and a speed of 150 rpm, and stirring was carried out for a further 30 minutes.

1.6 parts of acetylene black (Denka Black® (Denka)) was next mixed in a stirred state over the course of three instances, the temperature was raised to 70° C. while stirring was performed for 30 minutes, and the pressure was reduced to 0.01 MPa and held steady for 30 minutes to obtain a coated negative electrode active material. When the coated negative electrode active material was considered to have a core-shell structure, the average particle diameter of a hardly graphitizable carbon powder serving as the core was 9 μm. The solid content of the acetylene black was 1.6 mass % relative to 100 mass % of the coated negative electrode active material.

Creation of Coated Positive Electrode Active Material 140.0 parts of a lithium nickel-aluminum-cobalt oxide (NCA) (BASF Toda Battery Materials) was introduced into the all-purpose mixer, a solution in which 14.6 parts of dimethylformamide was added and mixed into 0.48 parts of a resin solution for coating the positive electrode active material (resin solid content concentration: 30 mass %) obtained above was added dropwise and mixed over the course of 3 minutes in a state in which stirring was carried out at room temperature and a speed of 15 m/s, and stirring was carried out for a further five minutes.

8.6 parts of acetylene black (Denka Black® (Denka)) was next mixed in a stirred state, the temperature was raised to 140° C. while stirring was performed for 60 minutes, and the pressure was reduced to 0.01 MPa and held steady for five minutes to obtain a coated positive electrode active material. When the coated positive electrode active material was considered to have a core-shell structure, the average particle diameter of a lithium nickel-aluminum-cobalt oxide powder serving as the core was 6 μm. The solid content of the acetylene black was 0.1 mass % relative to 100 mass % of the coated positive electrode active material.

Preparation of Electrolytic solution

Li[(FSO$_2$)$_2$N](LiFSI) was dissolved at a proportion of 2 mol/L in a mixed solvent of ethylene carbonate (EC) and propylene carbonate (PC) (volume ratio: 1:1) to obtain a electrolytic solution.

Preparation of Negative Electrode Active Material Slurry

From the coated negative electrode active material obtained as described above, a portion having an average particle diameter (D50) of 20 μm was separated in an amount of 616 parts, and a portion having an average particle diameter (D50) of 5 μm was separated in an amount of 264 parts. 76.5 parts of carbon fiber (Donacarbo Milled S-243 (Osaka Gas Chem), having an average fiber length of 500 μm, an average fiber diameter of 13 μm, and an electrical conductivity of 200 mS/cm) serving as an electroconductive member was added thereto, drying was carried out for 16 hours at a temperature of 120° C. and a reduced pressure of 100 mmHg, and a moisture-containing component was removed.

637.7 parts of the electrolytic solution obtained as described above was next added to the dried material described above in a dry room. The resultant mixture was stirred for 30 minutes at a rotation speed of 63 rpm and a revolution speed of 107 rpm using a mixing stirrer (5DM-r (planetary mixer) (Dalton)), whereby churning was implemented.

638.9 g of the electrolytic solution obtained as described above was then furthermore added, and the same mixing stirrer as described above was used to stir the resultant mixture in three instances for ten minutes each at a rotation speed of 63 rpm and a revolution speed of 107 rpm, whereby churning was implemented. A negative electrode active material slurry was thus obtained. The solid content concentration of the negative electrode active material slurry obtained in this manner was 41 mass %.

Creation of Positive Electrode Active Material Slurry 31.5 parts of carbon fiber (Donacarbo Milled S-243 (Osaka Gas Chem), having an average fiber length of 500 μm, an average fiber diameter of 13 μm, and an electrical conductivity of 200 mS/cm) serving as the electroconductive member was added to 1543.5 parts of the coated positive electrode active material obtained as described above, drying was carried out for 16 hours at a temperature of 120° C. and a reduced pressure of 100 mmHg, and a moisture-containing component was removed.

393.8 parts of the electrolytic solution obtained as described above was next added to the dried material described above in a dry room. The resultant mixture was stirred for 30 minutes at a rotation speed of 63 rpm and a revolution speed of 107 rpm using a mixing stirrer (5DM-r (planetary mixer) (Dalton)), whereby churning was implemented.

417.6 parts of the electrolytic solution obtained as described above was then furthermore added, and the same mixing stirrer as described above was used to stir the resultant mixture in three instances for ten minutes each at a rotation speed of 63 rpm and a revolution speed of 107 rpm, whereby churning was implemented. A positive electrode active material slurry was thus obtained. The solid content concentration of the positive electrode active material slurry obtained in this manner was 66 mass %.

Creation of Resin Current Collector 75 mass % of polypropylene (trade name "SunAllomer® PL500A" (SunAllomer)) (B-1), 20 mass % of acetylene black (AB) (Denka Black®), and 5 mass % of a modified polyolefin resin (Umex® 1001 (Sanyo Chemical Industries)) serving as a dispersant (A) for the resin current collector was melt-kneaded at a temperature of 180° C. and a speed of 100 rpm, with a residence time of 10 minutes, using a twin-screw extruder to obtain a material for the resin current collector. The resultant material for the resin current collector was extrusion-molded to obtain a resin current collector (20% AB-PP).

Creation of Electrode

The negative electrode active material slurry and the positive electrode active material slurry obtained as described above were applied to the surfaces of the resin current collector, and a pressing process was implemented. A positive electrode and a negative electrode were thus obtained.

Creation of Unit Cell

The positive electrode and the negative electrode were next stacked with a separator interposed therebetween to obtain a unit cell. Seal parts were disposed between outer peripheral portions of the resin current collector of the positive electrode and outer peripheral portions of the resin current collector of the negative electrode. The outer peripheral portions of the unit cell were then heat-sealed.

A pressing process was implemented on the unit cell obtained as described above.

Comparative Example 2

Figure 10:
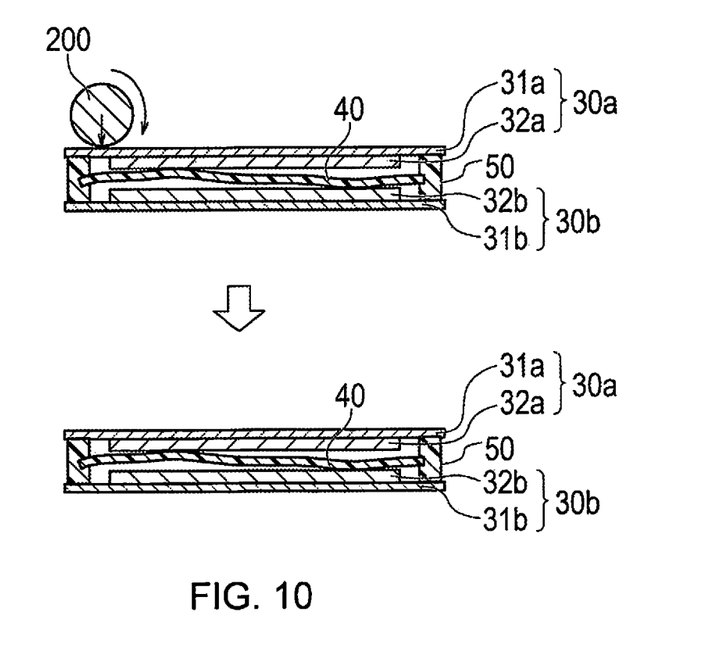
FIG. 10 is a cross-sectional diagram schematically showing a roll press step according to a comparative example.

A unit cell was formed through the same procedure as that in comparative example 1 described above. Roll pressing was performed on the resultant unit cell using a roll press device (SA-602 (Tester Sangyo)) as shown in FIG. 10. The pressing pressure of a pressing roll 200 of the roll press device was set to 2.0 (Pa).

Example 1

A unit cell was formed through the same procedure as that in comparative example 1 described above. Surface pressing was performed on the resultant unit cell as shown in FIG. 8 using a hydraulic surface press device 100 such as is shown in FIG. 7. The pressing pressure of a pressing surface was set to 29.4 (Pa).

Example 2

A unit cell was formed through the same procedure as that in comparative example 1 described above. Surface pressing was performed on the resultant unit cell as shown in FIG. 8 using a hydraulic surface press device 100 such as is shown in FIG. 7. The pressing pressure of a pressing surface was set to 9.8 (Pa).

Evaluation of Unit Cells

Creases on the surfaces of the unit cells obtained in comparative examples 1 and 2 and examples 1 and 2 were visually evaluated, and a creased area (%) was measured. To obtain the creased area (%), creases (irregularities) in the surfaces of the unit cells were observed, and a ratio of area of regions in which irregularities was formed relative to the total area of the surfaces of the unit cells was derived. Furthermore, the unit cells obtained in comparative examples 1 and 2 and examples 1 and 2 were charged to a SOC of 50% at a current rate of 1 C, a ten-second value of a DC resistance (DCR) was measured, and a resistance value was calculated. The creased area (%) and the resistance value for comparative examples 1 and 2 and examples 1 and 2 are shown in Table 1.

TABLE 1

| | Pressing method | Pressing pressure (Pa) | Creased area | Resistance value (mΩ/cell) |
|---|---|---|---|---|
| Comparative example 1 | No pressing | — | 80% | 7.5 |
| Comparative example 2 | Roll pressing | 2.0 | 80% | 7.5 |
| Example 1 | Surface pressing | 29.4 | 0% | 5.1 |
| Example 2 | Surface pressing | 9.8 | 0% | 5.1 |

As shown in Table 1, in comparative example 1 (no pressing), creases (irregularities) were confirmed in 80% of the surface of the unit cell, and the DCR resistance value was 7.5 (mΩ/cell). This is because creases in the current collector that were formed in the electrode formation step or the sealing step simply remained in the surface or interior of the unit cell. The DCR resistance value was also high because the contact resistance increased in a state in which creases remained in the surface or interior of the unit cell.

In addition, in comparative example 2 (roll pressing), as with comparative example 1, creases (irregularities) were confirmed in 80% of the surface of the unit cell, and the DCR resistance value was 7.5 (mΩ/cell). Thus, despite roll pressing having been performed, the reason that creases remained on the surface of the unit cell was that the roll press had a low pressing pressure, which is presumably why the creases in the surface or interior of the unit cell could not be adequately smoothed out. However, because there is a possibility that the unit cell will elongate and deform in the rolling direction of the roll when roll pressing is performed at a pressing pressure similar to that used in the surface pressing (9.8 (Pa) or higher), the pressing pressure could not be increased.

However, in examples 1 and 2 (surface pressing), no creases (irregularities) were confirmed in the surface of the unit cell. From this result, it is understood that irregularities in the surface of the unit cell were molded flat by the surface pressing. In addition, the DCR value in examples 1 and 2 (surface pressing) was 5.1 (mΩ/cell), lower than that in comparative examples 1 and 2. Because the internal resistance of the unit cell decreased, it is understood that creases inside the unit cell (in the separator) could also be removed.

The pressing pressure in example 1 was greater than that in example 2. Because creases (irregularities) in the surface of the unit cell could be molded flat in a shorter period of time in example 1, in which the pressing pressure was higher, it was possible to shorten the manufacturing time.

The invention claimed is:

1. A battery manufacturing method comprising:
    forming at least one unit cell comprising a positive electrode, a negative electrode, and a separator including an electrolyte layer disposed between the positive electrode and the negative electrode, wherein the forming of the at least one unit cell comprises:
        forming the positive electrode by coating a positive electrode active material layer containing an electrolytic solution on a positive electrode current collector,
        forming the negative electrode by coating a negative electrode active material layer containing an electrolytic solution on a negative electrode current collector, and
        interposing the separator between the positive electrode and the negative electrode;
    applying pressure to the at least one unit cell by bringing a pressing surface of a pressing part into surface contact with one unit cell of the at least one unit cell or with two or more stacked unit cells of the at least one unit cell from a stacking direction; and
    charging the one unit cell or the two or more stacked unit cells after performing the applying of the pressure to the one unit cell or the two or more stacked unit cells,
    the battery manufacturing method being carried out such that the positive electrode and the negative electrode are formed without the positive electrode active material layer or the negative electrode active material layer being subjected to a drying process performed through heating.

2. The battery manufacturing method according to claim 1, wherein
    the positive electrode current collector and the negative electrode current collector are resin current collectors; and
    further comprising heat sealing outer peripheral portions of the resin current collectors before performing the applying of the pressure of the pressing part to the one unit cell or the two or more stacked unit cells.

3. The battery manufacturing method according to claim 1, further comprising
    stacking a plurality of the unit cells to form a stack, and
    hermetically sealing the stack inside an outer cladding; and
    the charging of the one unit cell or the two or more stacked unit cells is performed after the hermetically sealing of the stack inside the outer cladding.

4. The battery manufacturing method according to claim 1, wherein
    the pressure used in pressing the at least one unit cell is 14.7-39.2 Pa.

5. The battery manufacturing method according to claim 1, wherein
    a binder content in the positive and negative electrode active material layers of the positive and negative electrodes is 1 mass % or less relative to 100 mass % of a total solid content.

* * * * *